(12) United States Patent
Wing et al.

(10) Patent No.: US 7,788,524 B2
(45) Date of Patent: Aug. 31, 2010

(54) FAULT-TOLERANT NETWORKS

(75) Inventors: Keith Wing, Hampshire (GB); Christopher Fitzpatrick, Wiltshire (GB); Wouter Senf, Hilversum (NL)

(73) Assignee: Neverfail Group Limited, Berkshire (GB)

( * ) Notice: Subject to any disclaimer, the term of this patent is extended or adjusted under 35 U.S.C. 154(b) by 217 days.

(21) Appl. No.: 12/146,778

(22) Filed: Jun. 26, 2008

(65) Prior Publication Data

US 2009/0138541 A1 May 28, 2009

Related U.S. Application Data

(63) Continuation of application No. 10/478,960, filed as application No. PCT/GB02/02473 on May 27, 2002, now Pat. No. 7,409,577.

(30) Foreign Application Priority Data

May 25, 2001 (GB) ................................ 0112781.0

(51) Int. Cl.
G06F 11/00 (2006.01)
(52) U.S. Cl. .............................. 714/4; 709/224; 703/21
(58) Field of Classification Search ....................... None
See application file for complete search history.

(56) References Cited

U.S. PATENT DOCUMENTS

| | | | |
|---|---|---|---|
| 4,674,038 A | 6/1987 | Brelsford et al. | |
| 5,452,462 A | 9/1995 | Matsuura et al. | |
| 5,488,716 A | 1/1996 | Schneider et al. | |
| 5,592,611 A * | 1/1997 | Midgely et al. | ................ 714/4 |
| 5,768,501 A | 6/1998 | Lewis | |
| 5,805,790 A | 9/1998 | Nota et al. | |
| 6,728,746 B1 | 4/2004 | Murase et al. | |
| 6,944,785 B2 * | 9/2005 | Gadir et al. | ..................... 714/4 |
| 7,024,450 B1 | 4/2006 | Deo et al. | |
| 7,197,561 B1 | 3/2007 | Lovy et al. | |
| 7,203,944 B1 * | 4/2007 | van Rietschote et al. | ..... 718/104 |
| 7,296,194 B1 * | 11/2007 | Lovy et al. | ..................... 714/57 |
| 7,430,688 B2 * | 9/2008 | Matsuno et al. | ............... 714/31 |

(Continued)

FOREIGN PATENT DOCUMENTS

WO    PCT/US94/07046    2/1995

OTHER PUBLICATIONS

Gary Hughes-Fenchel, "A Flexible Clustered Approach to High-Availability", 27th International Symposium on Fault Tolerant Computing (FTCS '97) in Seattle, WA, Jun. 24-27, 1997, pp. 314-318.

*Primary Examiner*—Christopher S McCarthy
(74) *Attorney, Agent, or Firm*—Davis & Associates

(57) ABSTRACT

Recovery systems and methods for sustaining the operation of a plurality of networked computers (20a,20b) in the event of a fault conditions are described. The basic recovery system comprises a plurality of virtual machines (31a,31b) installed on a recovery computer (30), each virtual machine being arranged to emulate a corresponding networked computer, and the recovery computer being arranged, in the event of a detected failure of one of the networked computers, to activate and use the virtual machine which corresponds to the failed networked computer (20). The recovery computer (30) may be located on the same network (12) as the networked computers (20), or alternatively on a remotely located local network in case of failure of the entire local network (12).

25 Claims, 10 Drawing Sheets

U.S. PATENT DOCUMENTS

| | | | |
|---|---|---|---|
| 7,533,229 B1 * | 5/2009 | van Rietschote | 711/161 |
| 7,577,959 B2 * | 8/2009 | Nguyen et al. | 718/105 |
| 7,587,633 B2 * | 9/2009 | Talaugon et al. | 714/21 |
| 2004/0205377 A1 * | 10/2004 | Nakamura et al. | 714/4 |
| 2005/0091354 A1 | 4/2005 | Lowell et al. | |
| 2005/0108593 A1 * | 5/2005 | Purushothaman et al. | 714/4 |
| 2006/0271575 A1 | 11/2006 | Harris et al. | |
| 2008/0126834 A1 * | 5/2008 | Sankaran et al. | 714/4 |

\* cited by examiner

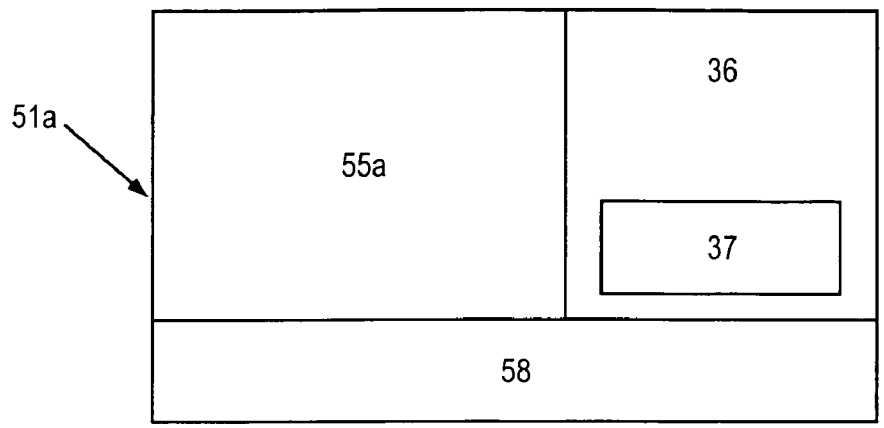
FIG. 3C
| PROCESSOR TYPE E.G. PENTIUM III |
| PROCESSOR MANUFACTURER E.G. INTEL |
| PROCESSOR SPEED E.G. 1000 MEGAHERTZ |
| RANDOM ACCESS MEMORY (RAM) E.G. 512 MEGABYTES |
| HARD DISK CAPACITY E.G. 40 GIGABYTES |
FIG. 3D
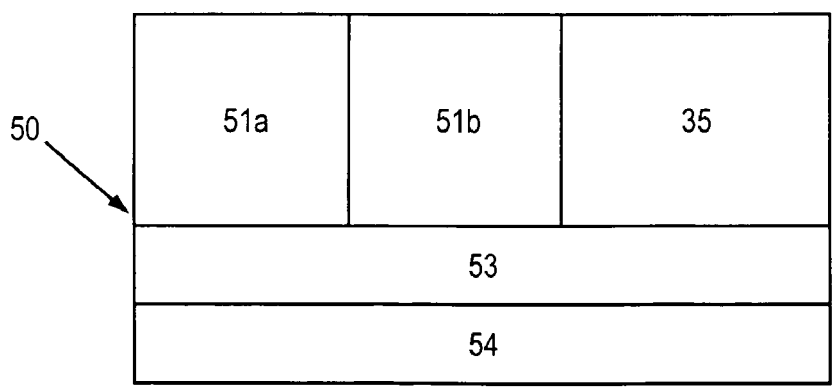
FIG. 3E

FAULT-TOLERANT NETWORKS

This application is a continuation of U.S. application Ser. No. 10/478,960 (now U.S. Pat. No. 7,409,577), filed on Apr. 22, 2004, which is incorporated herein by reference. U.S. patent application Ser. No. 10/478,960 was the National Stage of International Application No. PCT/GB02/02473 filed on May 27, 2002, which claims the benefit of priority of United Kingdom Application No. 011278.0 filed May 25, 2001.

TECHNICAL FIELD OF THE INVENTION

The present invention concerns improvements relating to fault-tolerant networks and particularly, although not exclusively, to various methods, systems and apparatus for the back-up of critical data by mirroring multiple critical computers on corresponding virtual machines which are installed on a single physical back-up computer.

BACKGROUND TO THE INVENTION

Enterprises around the world require ways to protect against the interruption of their business activities which may occur due to events such as fires, natural disasters, or simply the failure of server computers or workstations that hold business-critical data. As data and information may be a company's most important asset, it is vital that systems are in place that enable a business to carry on its activities such that the loss of income during system downtime is minimised, and to prevent dissatisfied customers from taking their business elsewhere.

To achieve business continuity, it is necessary for such a system to be tolerant of software and hardware problems and faults. This is normally achieved by having redundant computers and mass storage devices such that a backup computer or disk drive is immediately available to take over in the event of a fault. Such a technique is described in Ohran et al., International patent application WO 95/03580. This document describes a fault-tolerant computer system that provides rapid recovery from a network file server failure through the use of a backup mass-storage devices. There are, however, a number of reasons why the techniques used by Ohran and others may be undesirable.

As can be seen from the Ohran, each server requiring a fault-tolerant mode of operation must be backed up by a near-duplicate hardware and software architecture. Such one-for-one duplication may make it infeasible and uneconomic to run a redundant network file server instead of a normal network file server. Further, the need for a redundant network to be continuously on-line to ensure that it is updated at the same time as the normal network server renders its use as an off-line facility for testing infeasible. In addition to this, the majority of redundant networks are unable to provide protection against application failure and data corruption because they either use a common data source (e.g. the same disks) or they use live data. Also, the majority of redundant networks are unable to provide for test and maintenance access without the risk of either network downtime or loss of resilience of the network.

The present invention aims to overcome at least some of the problems described above.

SUMMARY OF THE INVENTION

According to a first aspect of the invention, there is provided a recovery system for sustaining the operation of a plurality of networked computers in the event of a fault condition, the system comprising a plurality of virtual machines installed on a recovery computer, each individual virtual machine being arranged to emulate a corresponding networked computer, and the recovery computer being arranged, in the event of failure of one of the networked computers, to activate and use the virtual machine which corresponds to the failed network computer in place of the failed network computer.

The advantage of this aspect of the invention is that it allows multiple physical computers (or "protected" computers) to be emulated on a single hardware platform, obviating the need for one-to-one copying of each networked computer with a separate physical recovery (or "catcher") computer.

A further advantage of the invention is that multiple computers can fail over to one single catcher computer, and this reduces the amount of hardware required to implement the back-up/recovery system. This has the effect of reducing costs. In addition to this, the cost of using software to install the virtual machines and associated software on the catcher computer is less than the costs of hardware that would be required to produce an equivalent physical back-up system. And, of course, the less hardware in a system, the lower the maintenance costs will be. In addition to this, managing software implemented virtual machines is easier than managing physical hardware which again leads to a cost reduction.

A yet further advantage of the invention is that an entire computing environment may be captured in software, and this provides room for the back-up/recovery system to be scaled-up easily and quickly without the need for additional expensive hardware. In addition, one can easily add additional protected computers that can be protected by the same catcher computer.

Each virtual machine (e.g., software that mimics the performance of a hardware device) is advantageously configured with its own operating system and network identity. In addition, each virtual machine within the physical catcher computer is advantageously isolated so that entirely separate computing environments can be hosted on a single physical server.

Preferably, the term computer includes a computer system.

Preferably the networked computers are physical server computers. Alternatively, the networked computers may be physical workstations such as personal computers, or a mixture of servers and workstations. Thus, in addition to servers, workstations are also capable of many-to-one concurrent recovery.

The servers may be, for example, SQL servers, Web servers, Microsoft Exchange™ servers, Lotus Notes™ servers (or any other application server), file servers, print servers, or any type of server that requires recovery should a failure occur. Most preferably, each protected server computer runs a network operating system such as Windows NT™ or Windows 2000™.

Preferably the plurality of protected computers and the catcher computer are part of a network such as a local area network or LAN, thereby allowing transmission of information such as commands, data and programs including active applications between the protected servers and the catcher. The LAN may be implemented as an Ethernet, a token ring, an Arcnet or any other network technology, such network technology being known to those skilled in the art. The network may be a simple LAN topography, or a composite network including such bridges, routers and other network devices as may be required.

Preferably the catcher computer is specified to have sufficient memory and mass storage device capacity, one or more Intel-compatible processors rated PII or greater, a Network Interface Card (such as Ethernet), a Compact Disk interface, a Floppy Disk Drive, serial ports, parallel ports and other components as may be required. In the case of a LAN which includes a large number of protected computers, multiple catchers each including a plurality of virtual machines may be required to provide the recovery function of the invention.

The catcher preferably has virtual computer software running on it which is programmed to allow logical partitioning of the catcher computer so that disparate operating environments and/or applications etc (such as Microsoft Exchange™) which normally require a dedicated computer platform may be run on the same platform as other instances of the same or different environments and/or applications etc. The virtual computing software preferably allows multiple concurrent and/or sequential protected server failures to be accommodated and controlled on a single catcher computer. Alternatively, the catcher may be partitioned into a plurality of virtual machines using, for example, hardware such as Cellular Multiprocessor technology which is used in Unisys ES7000 systems, or by any other suitable hardware technology.

The catcher virtual computing software provides concurrent software emulation of a plurality of protected computers which is defined by the manufacturer of the virtual computing software, and is also subject to limitations imposed by the catcher computer hardware. The maximum number of virtual machines capable of being supported by a catcher is currently sixteen, although this may be increased as the software and/or hardware is developed. However, if the virtual machines are implemented in hardware, the number of virtual machines supported by the catcher will again be determined by that hardware.

The protected computers and the catcher computer preferably both have replication software installed thereon which is used in the emulation process. The replication software is preferably capable of operating with minimum resource usage, and with low likelihood of conflict with other applications and hardware.

The replication software may be programmed to copy selected applications, files etc from a protected computer to the catcher computer via the network by providing the software with either a script containing instructions, or from instructions input to a graphical user interface. The replication software may also be instructed to keep the original (i.e. mirrored) copy of the protected server files and applications synchronised with the catcher copy of the files following initial mirroring. This process is known as replication.

In another embodiment of the invention, the catcher computer is located remotely, rather than being connected to the LAN. This aspect of the invention is known as remote backup. Remote backup is preferably achieved by sitting the catcher computer at a location other than that which houses the aforedescribed LAN environment. The backup catcher may be connected to the LAN environment by suitable telecommunications means. The advantage of this is that in the event of a major incident, all applications and data are safely stored in their most recently updated condition and made available for whatever purpose by accessing or running the catcher.

Alternatively, in a further embodiment of the invention there is provided an expanded recovery system comprising the aforedescribed recovery system and further including additional recovery computers, and a programmable console. This embodiment is advantageous as it provides a back-up and recovery system on a local area network, thereby reducing the cost and complexity of the wide area networking requirement implicit in the extended remote method which is described later.

The programmable console preferably provides a module for the automatic detection and interpretation of events on a network which may trigger the recovery process, and the storage of such images and commands, and the construction of such scripts and command files as are required to ensure that the optimum set of recovery computers may be delivered in response to any given failure condition. The programmable console preferably also includes a means of selectively switching on the power circuits of the recovery computers.

The additional recovery computers and the programmable console may be provided on a separate network remote from the local protected network but operably connected thereto, along with an additional catcher computer (the recovery catcher).

In this aspect of the invention, the aforedescribed recovery system is known as the "protected environment", and the additional system is known as the "recovery environment"—the combined systems being referred to as a "remote recovery network".

The further local network may be implemented as an Ethernet, a token ring, an Arcnet, or any other suitable network technology, such technology being known to those skilled in the art. Preferably, the protected environment and the recovery environment are linked by a telecommunications network (such as kilostream, megastream, T1, T2, leased line, fibre, ISDN, VPN, and using any such devices as appropriate, such as bridges, hubs and routers).

As with the protected catcher, the recovery catcher preferably has installed thereon multiple virtual machines. These virtual machines are preferably arranged to emulate corresponding multiple protected computers.

The present invention also extends to a method for sustaining the operation of a plurality of networked computers in the event of a fault condition, the method comprising: emulating a plurality of networked computers on a corresponding plurality of virtual machines installed on a single recovery computer; detecting failure of at least one networked computer; attaching the virtual machine which corresponds to the failed networked computer to the network; and activating and using the virtual machine in place of the failed networked computer.

The step of emulating the plurality of protected networked computers preferably includes copying (or "mirroring") files and other data from the protected servers to the corresponding virtual machines. The mirroring process may be carried out as a once-only activity or, alternatively, it may be followed by a replication process.

Replication preferably occurs by identifying changes on the protected computer(s) and applying the same changes to the copy of the information on the catcher computer so that the protected computers and the virtual machines are substantially synchronised. This has the benefit of the changes in the protected server files being reflected in the catcher copy of those files within an acceptably short time frame, thereby giving added protection to users of the network such that when a failure occurs, data which was present on the protected servers is ultimately available to the users via the catcher computer.

However, replication does not have to be carried out continuously. For example, a network administrator may decide that replication does not have to be carried out at night, when no changes are being made to the protected computers.

Preferably the step of mirroring files from the protected servers to the virtual machines on the catcher computer may be initiated either manually, or automatically (for example, by replication software or other suitable monitoring program capable of detecting a pre-programmed signal or event).

The method preferably also comprises the step of setting up or initialising the system so that the recovery function may be provided. The step of setting up the recovery network preferably comprises configuring the catcher computer, creating the virtual machines on the catcher computer, and duplicating the networked protected computers on respective virtual machines.

Preferably, the step of configuring the catcher computer includes installing an operating system on the catcher computer and configuring the operating system parameters. This step preferably further includes installing virtual computing software on the catcher computer and configuring the virtual computing software parameters. Alternatively, the step of configuring the catcher computer may include configuring the computer hardware if the virtual machines are hardware, rather than software, implemented.

Preferably, the step of creating the virtual machines on the catcher computer comprises installing substantially identical copies of the operating system installed on each protected computer on each respective virtual machine, and configuring the virtual machine operating system parameters. Most preferably, one virtual machine is created for each protected computer. The creating step may be carried out via a virtual computing software management console or other suitable user interface.

The step of duplicating the protected computers on the respective virtual machines preferably comprises substantially replicating the environment installed on each protected computer on the corresponding virtual machines on the catcher computer. By environment, it is meant applications, utilities, and any other agents that reside on the protected computer. This may be achieved by copying the protected computer to a virtual machine using the replication software, and modifying such registry and system files as may be required. Alternatively, the duplication process may be carried out by restoring backup tapes and modifying such registry and system files as may be required, repeating for the virtual machine the exact installation sequence undertaken to arrive at the present condition of the protected computer, or via any other suitable method.

The method advantageously includes the step of installing replication software on each protected computer and virtual machine. This step is important as the replication software not only enables the synchronisation of data between the protected computers and the catcher computer, but may also monitor the network for failures. Alternatively, the monitoring of the network may be undertaken by a separate monitoring program.

Replication may be initiated either manually or automatically. Most preferably, the replication software is chosen so that normal LAN operations are not interrupted. Preferably, the method further includes the step of creating replication scripts which instruct the mirroring and/or replication process. These replication scripts may contain information such as the network identities of the protected (source) computers and the catcher (target) computer.

Preferably the failure of at least one of the networked protected computers is detected by the catcher computer, either via a virtual machine or most preferably by a monitoring module. The monitoring module may be located in a separate unit remote from the catcher computer, or on the catcher computer itself. Alternatively, the monitoring module may be part of a virtual machine. Failure may thus be detected by the catcher computer and/or the monitoring module receiving a failure signal. The catcher (or other suitable component) may periodically check the status of the protected servers on the network, in which case the failure signal may be the detection of the absence of a "heartbeat" signal from one or more of the protected computers. The failure signal may be transmitted to the console. If the failure signal is incorporated in a file, then this file may be sent to the console via File Transfer Protocol, or via any other suitable method.

Failure of a protected computer may be an outright failure of one or more of the system hardware components. Alternatively, it may include removal of the protected computer from the network, either accidentally or intentionally. It may further include the failure of one or more applications (for whatever reason) running on one or more of the protected computers.

If any such status information or failure signal indicates that one or more of the protected computers or an application running or installed thereon has failed, the catcher computer can activate the information copy held in the virtual machine and can assume the protected computer's identity. This is achieved by a software agent running on the catcher computer preferably automatically activating the copy of the information (e.g. a Microsoft Exchange™ application) the catcher computer has previously collected (either by replication or mirroring) from the failed protected computer. The virtual machine corresponding to the failed protected computer can then advantageously assume the failed protected computer network identity. The failed protected computer can then preferably enter a failed condition, the process being known as "failover".

The catcher computer may receive information relating to active application programs running on the protected computers, but it preferably does not run any of the copies of the applications which exist on the virtual machines until a failure is detected. The advantage of this is that during normal operation of the network, the catcher computer is only processing data (or file) changes which enable it to catch information in near real-time from multiple protected computers without significant performance degradation.

The method may further include the step of the catcher continuing to replicate protected servers that have not failed whilst the protected computer is in a failed state. The benefit of this is that users with computers connected to the network suffer a tolerably brief period of failed computer inactivity before being able to resume with substantially intact information and functionality and LAN performance, that is, with minimum interruption to normal business processing. In addition to this, the change over from the failed protected computer to the virtual machine is also very quick, bringing the same advantages.

The method may further include the step of repairing or replacing the failed protected computer, if required. Alternatively, if the failure was due to a protected computer being disconnected from the network, the step of reconnecting the protected computer to the network may occur.

The method may also include restoring information (e.g., Microsoft Exchange™ and accompanying files, and Windows NT™ operating system) which had been held on the failed protected computer to the new/repaired protected server from the catcher computer.

After the protected computer (which may be either a brand new computer, a repaired computer, or the original computer) has been reconnected to the network, the protected server is preferably resynchronised with the catcher computer, and the virtual machine may then relinquish its identity to its corresponding protected server (this process being known as "failback"). The advantage of failback is that user access to the protected computer, which had previously failed, may be resumed with substantially intact information (e.g., operating systems, applications and data) with full functionality and LAN performance. Another advantage is that failback may be scheduled to take place at a time that is judged convenient, so that users suffer a tolerably brief period of downtime.

A further advantage of the present invention is that a copy of the protected computer's environment (i.e. the operating system and applications/utilities) and files can exist as an "image", such that under normal operating conditions the virtual machine is not performing any of the processing activities being performed on the protected computers, thereby reducing the demand on the catcher computer's resources, and enabling multiple protected computers to be replicated effectively in a relatively compact catcher environment.

Another advantage of this aspect of the present invention is that it permits recovery of applications running on protected computers such that in the event of an application failure being detected, but where the protected computer hosting the application remains operational, the catcher computer is capable of substantially immediately providing continuity of application services to users. The invention also gives the benefit of providing a way to permit workstation continuity such that in the event of a workstation (such as a PC) failing for any reason, the operating system and applications running on the workstation are substantially replicated on the catcher computer, thereby permitting access to users from other interfaces substantially immediately.

This aspect of the invention may also be used to enable workstation hot-desking, such that PC operating systems and applications are capable of running on the catcher under normal conditions such that users can access them from disparate workstations and locations.

The aforementioned embodiments of the invention provide near-immediate recovery from single or multiple concurrent computers and/or application failures within a LAN without the need for multiple redundant servers thereby allowing near-continuous business processing to take place.

It is further desired to provide a method of rapid recovery from a major incident such as a fire or similar destructive incident affecting an entire (or part of a) LAN environment. This may be achieved by carrying out the aforedescribed method on a system having a first local network comprising a first protected catcher and a plurality of protected computers (the protected environment), and a second remotely located network comprising a second recovery catcher and a plurality of recovery computers (the recovery environment). This aspect of the invention provides the ability to replicate remotely the entire protected environment on the recovery environment. It can also enable an entire protected computer to be replicated on a recovery computer upon failure of the protected computer.

This aspect of the invention preferably includes the step of installing the protected environment as previously described.

The step of installing the recovery environment preferably comprises: configuring and preparing the recovery catcher; creating and configuring a plurality of virtual machines on the recovery catcher; connecting the plurality of recovery computers to the recovery network; and establishing a network connection between the protected environment and the recovery environment.

The installation step may also include the step of preparing a programmable console and physically attaching it to the recovery network. However, in another embodiment of the invention, the console may be attached to the protected network rather than the recovery network. The programmable console may perform the following functions: the automatic detection and interpretation of events on a network which may trigger the recovery process; storing images and commands; constructing scripts and command files which may be required identify the optimum set of recovery computers; and selectively switching on the power circuits of the recovery computers.

In this aspect of the invention, the emulation step may be carried out by connecting the protected catcher to the recovery catcher by suitable telecommunications means and copying the virtual machines from the protected catcher to the recovery catcher. Alternatively, the protected computers may be configured to additionally synchronise directly with the virtual machines on the recovery catcher. This second method is advantageous in that loss of access to the protected catcher for whatever reason does not impact on the ability to recover applications or data, but it does place an additional communications overhead on the protected computers as a dual-write is required to the protected catcher and the recovery catcher during normal operation.

Preferably the copying step comprises configuring and activating the replication software installed on the recovery catcher virtual machines and their corresponding protected catcher virtual machines so that files are synchronised between the protected computers and the corresponding recovery catcher virtual machines. This step may further include configuring and activating the replication software installed on the recovery computers themselves, so that they may also be synchronised directly with the protected catcher virtual machines.

During normal operations, the protected catcher thus preferably operates in local recovery mode maintaining a synchronised copy of the protected computers' information such as applications, files and other data. Updated components of this information may be almost simultaneously transmitted via the local (protected) network to the recovery catcher, thereby maintaining synchronised copies of the information on the protected computers.

The images residing on the protected catcher, the recovery catcher and elsewhere in the recovery environment can be advantageously synchronised with each of the respective protected computers by specialised means that do not significantly interrupt protected environment operations.

The method preferably also comprises monitoring the protected network to detect possible failures. The monitoring step is advantageously carried out by the console.

As in the previously described local recovery method, if a failure is detected, the appropriate virtual machine on the protected catcher preferably substantially immediately adopts the failed protected computer's identity and function. Then, the protected catcher preferably transmits the identity of the failed protected computer to the recovery network. This may be carried out by the protected catcher sending a file using, for example, File Transfer Protocol, or any other protocol that is suitable for transmitting information between the protected and the recovery environments such as email, short message service (SMS), fax, telephone, WAP, and internet.

The method preferably includes the further step of identifying and rebuilding an appropriate recovery computer which may be used to replace the failed protected computers. The step of identifying and rebuilding the appropriate recovery computer may be carried out automatically.

Preferably, the identifying step is carried out by a database which may contain pre-installed information regarding the most appropriate recovery computer to replace any failed protected computer. The recovery computer may have a pre-installed boot image installed thereon so that upon booting up they are network enabled.

Preferably, the rebuilding step comprises installing an image of the failed protected computer on the (pre)selected recovery computer. This is preferably carried out by rebooting the recovery computer; loading recovery computer image onto the recovery computer; creating a replication script; restarting the recovery computer; and sending a signal to the console that the recovery computer is on-line and ready for replication. The rebuilding step is advantageously initiated by the console.

The recovery server is preferably restarted via a back door disk partition. The advantage of this is that it allows the overwriting of system critical files and registry entries without affecting the running operating system.

The method preferably further comprises the step of physically relocating and attaching the replacement replica computer to the protected network.

An advantage of the remote recovery aspect of the invention is that in the event of a major interruption affecting the protected environment, the separate and substantially synchronised recovery environment is unaffected and is capable of being made rapidly available to user. A further advantage of this aspect of the invention is that in the event of a failure of single or multiple computers in the protected environment, the recovery computers can be built (either on-line or off-line), detached from the recovery local network, and physically installed on the protected LAN within a significantly shorter timeframe than has previously been possible. The replacement computer can be automatically selected and rebuilt without substantial user intervention, and can be rebuilt on dissimilar hardware.

The method may further include the step of attaching at least one recovery server to the recovery environment to replace the recovery server that has been removed from the network.

The above method may also be used to reconstruct the protected environment from the recovery environment should a protected environment failure occur.

In a yet further aspect of the invention, the aforedescribed remote recovery environment may be used to provide a method of carrying out system management activities such as the testing and installation of upgrades, the method comprising: emulating a plurality of networked protected computers on a corresponding plurality of virtual machines installed on a single recovery computer; building replica recovery computer (s) while maintaining protected computer operation; physically detaching the recovery computer(s) from the recovery environment and attaching them to a test network so that they may be used for system management activities.

Once testing and/or the other system management activities are complete, operational data may be removed from the detached recovery computer(s), and the recovery computer(s) reattached to the recovery environment.

According to a yet further aspect of the invention there is provided a method of providing a back-up and recovery network comprising: emulating a networked computer on a first virtual machine and a second virtual machine installed on a recovery computer, the first and second virtual machines containing images of the networked computer taken at different time periods so that, in the event of failure of the networked computer, the virtual machine representing the most appropriate time period can be used to replace the failed networked computer.

Preferably, the emulating step comprises emulating the networked computer on further virtual machines installed on the recovery computer, each further virtual machine containing an image of the networked computer taken at a time different to that of the other virtual machines.

This aspect of the invention may be implemented on any of the recovery systems described herein. Preferably the network further including means for identifying the most appropriate virtual machine having the best "snapshot" of the protected computer environment. Identification of the most appropriate virtual machine may be carried out either manually or automatically.

This aspect of the invention provides the facility to manage single or multiple time-delayed images (i.e., snapshots) of specified protected computers, such images being capable of being captured, stored, loaded and run either via manual intervention or programmably at specified times and dates on appropriate physical hardware thereby offering the possibility of recovering from data corruption (known as "rollback"). In this manner, time-delayed copies of protected server and file images can be automatically obtained and held, and are capable of being rapidly adopted or interrogated.

It may also provide means to permit specified copies of protected computer images to be authenticated as being substantially free from contamination by a computer virus and to provide inoculation of a protected network with an anti-virus agent (such as those produced by Symantec, Sophos, McAfee, MessageLabs) to facilitate re-introduction of an authenticated protected computer image to the network and run it, and to selectively permit quarantined transactions to be inoculated and resubmitted to protected applications (known as "virus recovery").

BRIEF DESCRIPTION OF DRAWINGS

Presently preferred embodiments of the invention will now be described, by way of example only, with reference to the accompanying drawings. In the drawings:

FIG. 3C is a schematic diagram of a typical virtual machine installed on a catcher computer in the recovery network of FIG. 3A;

FIG. 3D is a schematic representation of a data record that is used to optimise recovery computer selection according to second, third and fourth embodiments of the invention;

FIG. 3E is a schematic diagram of a further catcher server suitable for use with the second and third embodiment of the invention;

DETAILED DESCRIPTION OF PREFERRED EMBODIMENTS

Figure 1A:
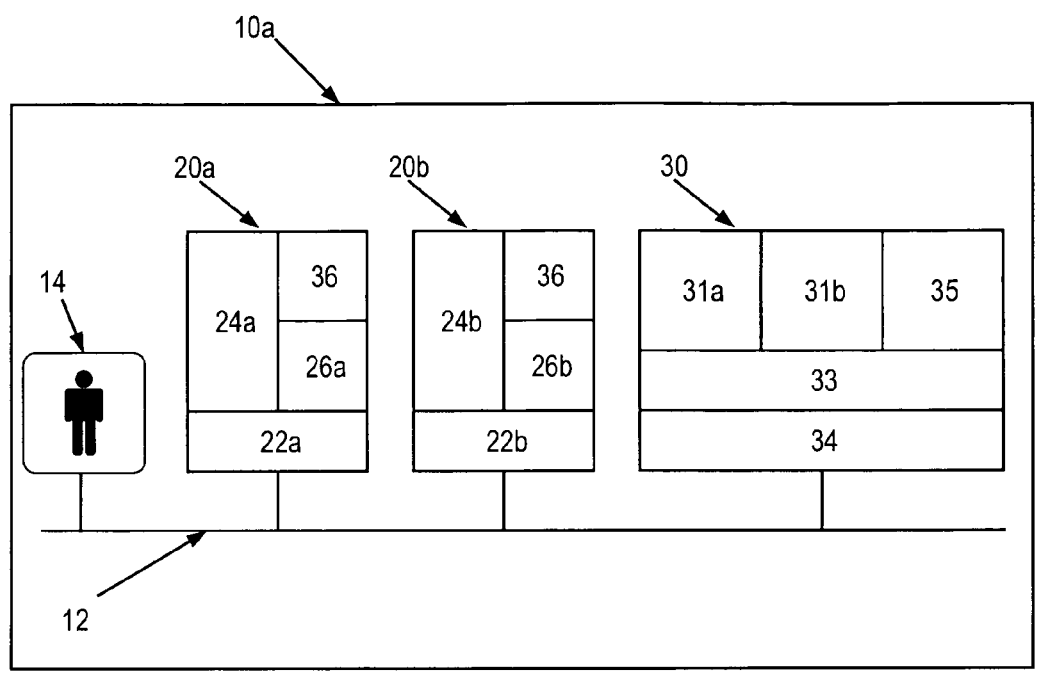
FIG. 1A is a schematic diagram showing networked protected servers and a catcher server suitable for implementing a method of recovering data (the local recovery method) according to a first embodiment of the present invention.

Referring to FIG. 1a, there is now described a networked system 10a suitable for implementing a method of backing-up and recovering data according to a first embodiment of the present invention. The system 10a shown includes a first 20a, a second 20b and a third 30 computer system, which in this case are server computers. Each server 20a, 20b, 30 is connected to a network 12 through an appropriate standard hardware and software interface.

The first and second computer systems 20a,20b represent servers to be protected by the present embodiment of the invention, and are referred to herein as "protected" servers. Each protected server 20a,20b is an Intel-based platform running a respective network operating system 22a,22b (such as Windows NT™ or Windows 2000™). The protected servers 20a,20b host one or more respective application programs 24a,24b (such as Microsoft Exchange™ or Lotus Notes™) and files 26a,26b, or they may be used as a means of general network file storage. Also each protected server 20a,20b includes replication software 36 as will be described later.

The third computer system 30 is known as the "catcher", and is specified to have sufficient memory, sufficient mass storage device capacity, one or more Intel-compatible processors rated PII or greater, Network Interface Card (such as Ethernet), Compact Disk interface, Floppy Disk Drive, serial ports, parallel ports and other such components (not shown) as may be required by specific embodiments of the present invention.

The catcher 30 runs under an operating system 34 that supports virtual computing software 33 (such as GSX or ESX supplied by VMware™). The virtual computing software 33 provides concurrent software emulation of the protected servers 20a,20b. The virtual computing software 33 is programmed to eliminate the problems encountered when multiple normally incompatible applications are co-hosted on a single server.

Each protected server 20a,20b is represented as a respective dedicated virtual machine 31a,31b by the virtual computing software 33. Each such virtual machine has configurable properties for mass storage, memory, processor(s), ports and other peripheral device interfaces as may be required by the server 20a,20b, and as may be supported by the virtual computing software 33. In this manner, each virtual machine 31a,31b contains a near-replica of its corresponding protected server's operating system 22a,22b, files 26a,26b, applications and utilities 24a,24b and data.

Figure 1B:
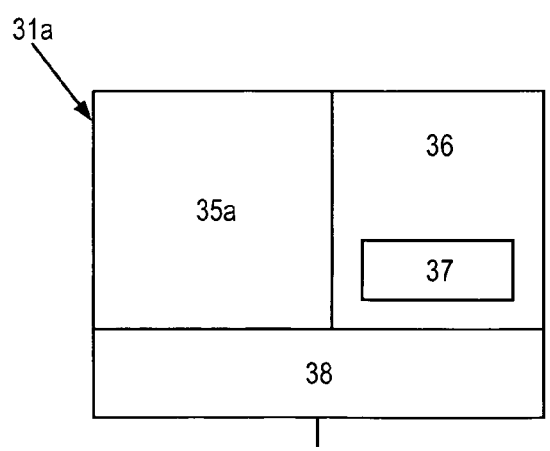
FIG. 1B is a schematic diagram of a virtual machine installed on the catcher server of FIG. 1A.

FIG. 1b shows a protected server image for the first protected server 20a residing as a virtual machine 31a created by the virtual computing software 33. The protected server image includes an operating system 38, applications 35a, and replication software 36. The properties of the virtual machine 31a are configured via a proprietary virtual computing software user interface 35 (such as that supplied as part of VMware's GSX product) in order to map the protected server 20a onto the available physical properties managed by the operating system 34 running on the catcher 30. The properties of the other virtual machine 31b are similarly accessible, and may also be altered via the virtual computing software user interface 35 running on the catcher 30.

The function of the replication software 36 (such as DoubleTake supplied by NSI) is now described. The replication software 36 is programmed to run a customisable batch command file 37 (also called a "replication script") which resides on the catcher virtual machine 31a. When run, the batch command file 37 is capable of delivering commands to the operating system 38 and applications 35a within a specified virtual machine 31a (such as suspending replication of data or causing a copy of a specified protected server 20 environment to be connected to the network 12 and activated).

The replication software 36 is also capable of receiving a sequence of pre-programmed instructions in the form of a file-resident script that contains replication parameters and commands (such as the network address of the source files to be copied). These instructions are capable of being issued manually via a console 60 (described later) or a GUI of the virtual computing software interface 35. The replication software 36 is also capable of being programmed to monitor the protected server 20a for user-specified events (such as the absence of a 'heartbeat signal') and on detection of such an event executing other commands that may affect the systems and network environment. For each use of the replication software 36, there is defined a source server from which information is copied and a target server that receives the copied information.

A method of setting up the catcher 30 and carrying out local back-up and recovery of a protected server 20 using the system 10a according to the first embodiment of the present invention is now described with reference to FIGS. 2, 7 and 8.

Figure 2:
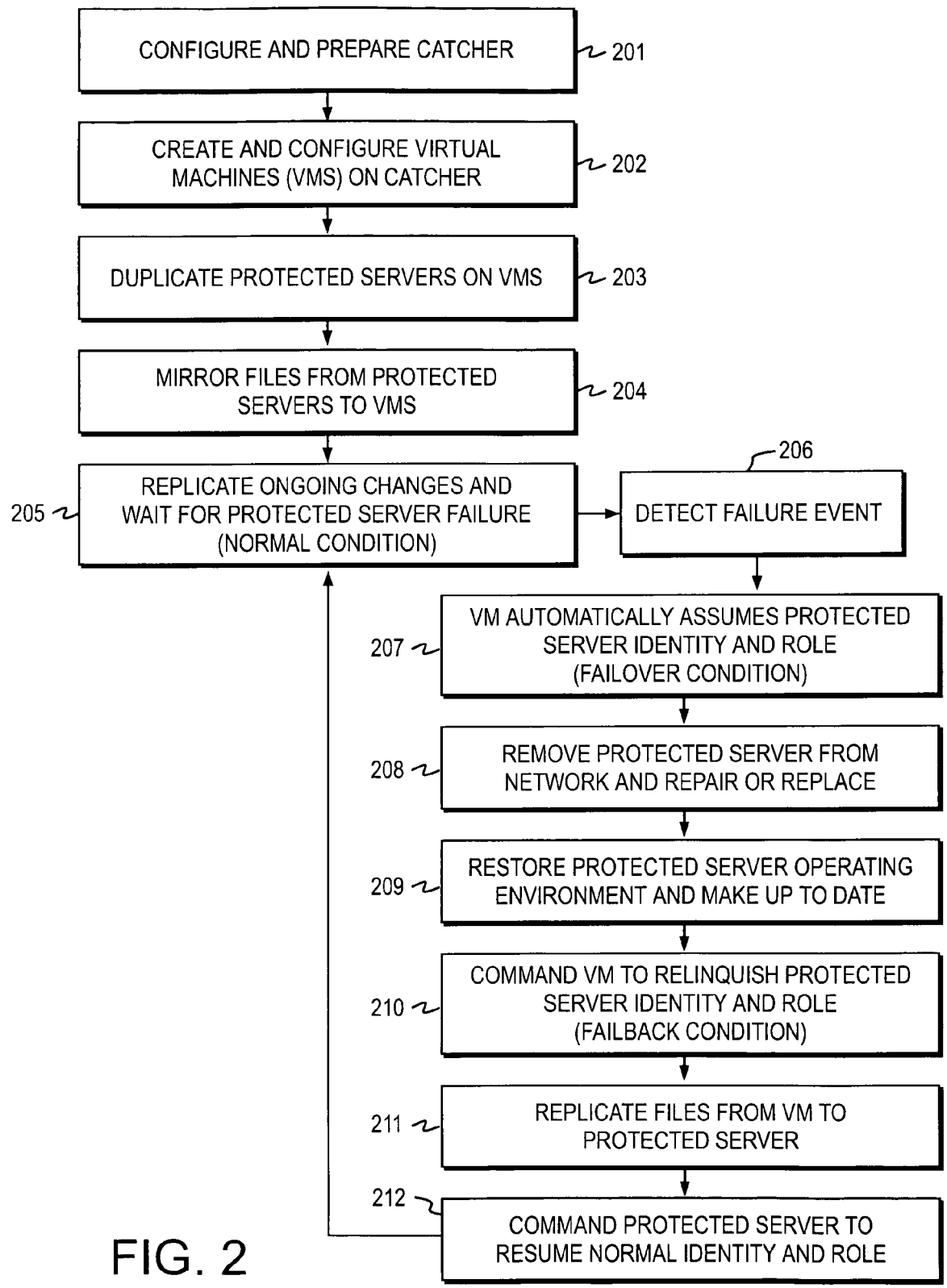
FIG. 2 is a flow diagram showing the steps involved in setting up and using a recovery network for the recovery of critical data, according to at least the first embodiment of the invention.

Referring to FIG. 2, in order to enable recovery of the protected servers 20a,20b to be carried out, the catcher hardware 30 is physically installed and configured at Step 201 generally according to the manufacturer's instructions (such as by running the ServerRAID™ program CD for IBM Net-Finity™ servers, or SmartStart™ for Compaq Proliant™ servers). The catcher operating system 34 (such as Red Hat Linux™ or Windows 2000™) is then installed and its operating parameters (e.g. parameters relating to network cards and/or hard disk management etc) are configured according to the virtual computing software 33 requirements, such requirements being familiar to those skilled in the art. The virtual computing software 33 is then installed, and its operating parameters configured according to the manufacturer's instructions and specific solution requirements.

In Step 202, the virtual computing software management console or equivalent user interface 35 is used to create and configure the virtual machines 31a,31b to support the respective protected servers 20a,20b (one virtual machine 31a,31b being created for each protected server 20a,20b). Substantially identical copies of the operating system 22a,22b installed on each protected server 20a,20b are installed on each respective virtual machine 31a,31b.

In Step 203, the installed environment (i.e., the applications 24a,24b, utilities, and other protected server-resident agents or applications that interact with the applications 24a, 24b) present on the first and second protected servers 20a,20b is substantially replicated within its respective virtual machine 31a,31b. The replication software 36 is then installed on each protected server 20a,20b and virtual machine 31a,31b, and replication scripts 37 are created to instruct the mirroring and replication process. The scripts are then copied to the appropriate virtual machine 31a,31b.

In Step 204, the replication software 36 is activated and mirrors (i.e. copies) each selected protected server file 26a, 26b onto its respective replication virtual machine 31a,31b according to its respective replication script 37.

Figure 7A:
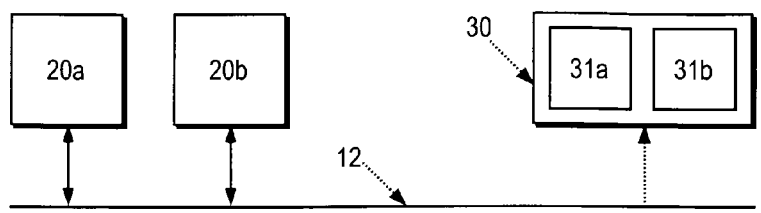
FIGS. 7A, 7B, 7C, 7D, and 7E illustrate a state diagram showing the connectivity sequence of events during the failover and failback processes according to presently preferred embodiments of the invention.

Step 205 is substantially contiguous with Step 204, whereby on completion of the mirroring activity, "replication" is initiated such that any subsequent and concurrent changes to the files 26a,26b on the protected servers 20a,20b are thereafter more or less continuously synchronised with their respective virtual machines 31a,31b during normal operating conditions. The protected servers 20a,20b have full accessibility to the network 12 and are thus continuously synchronising with their respective virtual machines 31a, 31b, as illustrated in FIG. 7a. This condition persists until a failure or other disruption occurs and is detected by the replication software 36.

Figure 8:
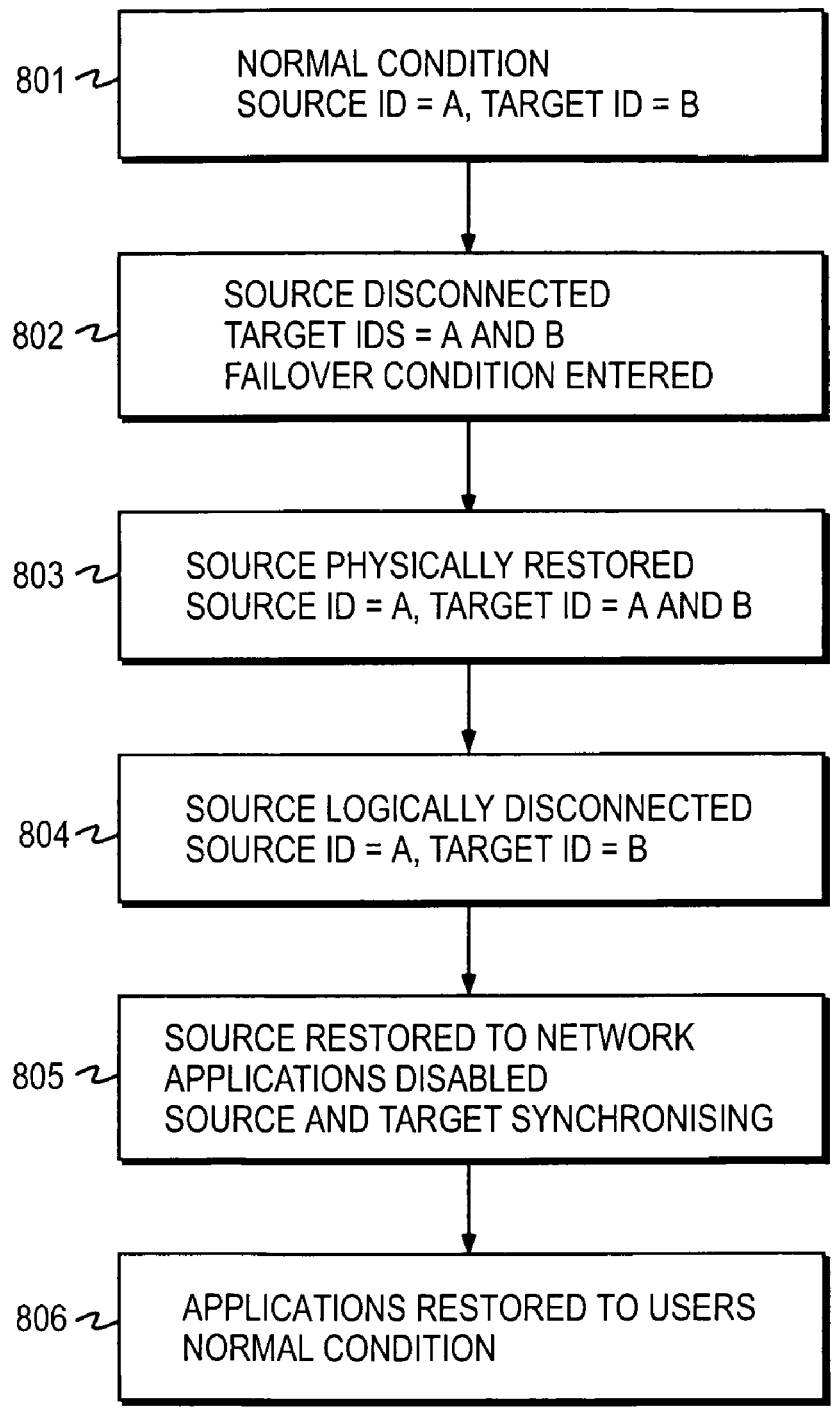
FIG. 8 is a flow diagram showing the network identities of the protected server and the catcher during the failover and failback processes according to presently preferred embodiments of the invention.

Referring now to FIG. 8, Step 801 shows that in the present conditions where there are no problems on the network 12, the first protected source server 20a has its normal identity A, and that the target catcher 30 has its normal identity B. It is important to understand that in the presently preferred embodiments of the invention, no two entities on the same network can possess the same network identity.

Figure 7B:
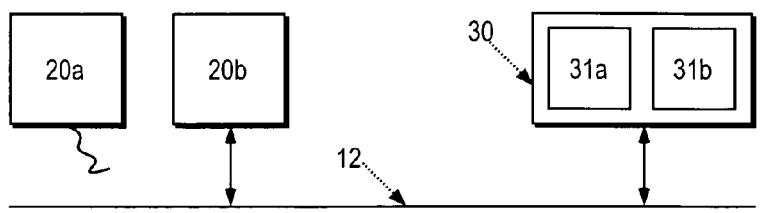

Returning now to FIG. 2, in Step 206 a pre-defined failure event (such as the culmination of a pre-defined period during which a "heartbeat" signal from the first protected server's replication software 36 is found to be absent) is detected by the corresponding virtual machine's monitor program (which is part of the replication software 36) and triggers batch command file 37. The failure is such that the first protected server 20a is logically (and optionally physically) disconnected from the network 12 and can no longer synchronise with its corresponding virtual machine 31a as shown in FIG. 7b.

In Step 207, the replication script 37, triggered by the replication software 36. This causes the virtual machine 31a to assume the network identity and role of the failed protected server 20a and start the application programs 35a installed on the virtual machine 31a. For example, if the protected server 20a had been a Microsoft Exchange™ server, then the copy of Microsoft Exchange™ installed on the virtual machine 31a would be started. Any other script-driven programmable event is also initiated by the running of the script 37. This occurs without disrupting or substantially affecting any other virtual machine session on the catcher 30. Transmit messages are then optionally transmitted to network users 14 and to notify the remote network management console (which is described later) of the failure event.

The running of the batch command file (or replication script) 37 causes the protected source server 20a to have no identity, and the target virtual machine 31a to have its normal identity B together with an assumed identity A, the former identity of the protected server 20a (as shown in Step 802 of FIG. 8). This set of actions is called "failover" and causes the virtual machine 31a to enter the failover condition and substantially replace the functionality of the failed protected server 20a. In this manner, a user 14 on the network 12 is able to use the application 35a installed on the virtual machine 31a as if it were running from the failed protected server 20a. The applications, files and utilities etc on the virtual machine 31a being interacted with as a result of user (or applications, etc) interaction.

In Step 208, the failed and now logically disconnected protected server 20a is available to be removed from the network 12 for repair or replacement. There are instances where it may be beneficial for it to be repaired in situ such as replacement of an accidentally broken network connection. Under other circumstances, such as fire damage, it may be necessary for the server 20a to be replaced in its entirety. In these cases, physical disconnection of the protected server 20a from the network 12 is warranted.

Figure 7C:
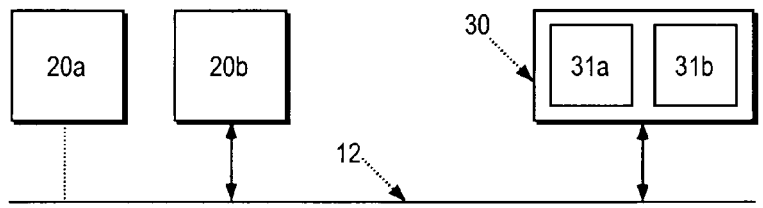

When the protected server 20a has been replaced or repaired and reconnected to the network 12 (if applicable), the operating system 22a, and applications/utilities 24a in their current condition are copied to the protected server 20a from the virtual machine 31a (Step 209). The identity A of the protected server 20a is also restored. However, the protected server 20a remains logically disconnected from network 12 and unsynchronised with its corresponding virtual machine 31a, as illustrated by FIG. 7c. Step 803 of FIG. 8 shows the protected source server 20a restored, and the target catcher 30 retaining its normal identity B and the assumed identity of the protected server, A. At this stage, the virtual machine 31a is still running in failover condition and all applications 24a on the protected server 20a are inactive.

Figure 7D:
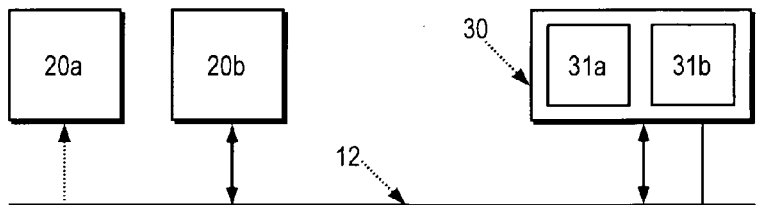

In Step 210, the virtual machine 31a is commanded manually or remotely via the virtual computing software management user interface 35 to relinquish its duplicate identity (i.e. A and B) and role to the protected server 20a and maintain its pre-failover identity and role. This is known as the "failback" process and gives rise to the failback condition. In this state, neither the protected server 20a nor the failback virtual machine 31a has access to the network 12. However, this only occurs for a short period of time. Step 804 of FIG. 8 shows the target catcher 31a retaining its normal identity B but releasing the identity of the protected server 20a such that the protected source server identity, A, is restored. The protected server 20a is thus logically reconnected to the network 12 (as shown in FIG. 7d).

In Steps 211 and 805, the protected server applications 24a remain inactive preventing all user interaction and avoiding changes to the protected server 20a itself. The replication software 36 is then run against its replication script 37 with the protected server 20a as its target and the virtual machine 31a as its source. This causes replication to take place between the failover virtual machine 31a and the protected server 20a, thereby copying files 26a from the virtual machine 31a to the protected server 20a, culminating in full synchronisation between the two.

Figure 7E:
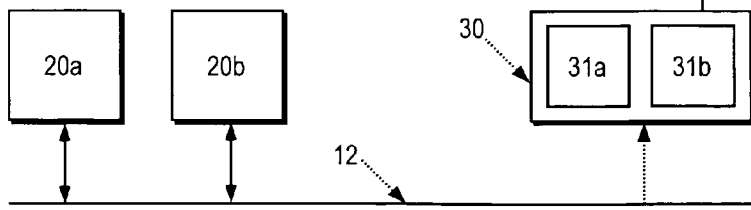

In Step 212, the protected server applications 24a are activated and made available to users 14, restoring the protected server 20a to normal condition (see Step 205), such that the protected server 20a has full accessibility to the network 12 and is continuously synchronising with its corresponding virtual machine 31a (see FIG. 7e). Step 806 of FIG. 8 shows that the protected source server 20a has its normal identity A, and that the target catcher 31a has its normal identity B.

Returning now to FIG. 3a, there are shown first and second environments 10b,10c which, when combined, are suitable for implementing a second embodiment (the "extended remote" method) of the present invention which is suitable for use when failure of one or more protected servers 20 occurs. The first and second environments 10b,10c are now described.

Environment 10b comprises three protected server computers 20a,20b,20c in communication with a protected catcher 30 via a local network 12. This arrangement is referred to hereinafter as the "protected environment". The protected servers 20a,20b,20c and the protected catcher 30 all configured in the manner of the first embodiment of the invention.

The second environment 10c comprises a remote local network 16 to which are attached three recovery servers 40, a recovery catcher 50, a console 60 (such as a customised PC) and a database 62 (such as SQL, Access or OMNIS). This configuration 10c is hereinafter known as the "recovery environment". The protected environment 10b and the recovery environment 10c are linked by connecting the local network 12 to the remotely located local network 16 via a telecommunications connection 11.

The recovery catcher 50 (shown in FIG. 3e) has substantially the same configuration as the protected catcher 30, i.e. it has an operating system 54, and virtual computing software 53 for implementing multiple virtual machines 51a,51b. Each protected catcher virtual machine 31a,31b etc is represented in the present embodiment by an identical virtual machine 51a,51b etc on the recovery catcher 50. Such an identical virtual machine 51a (shown in FIG. 3c) comprises applications 55a, replication software 36 and a customisable batch file 37, supported by a virtual machine operating system 58.

Each recovery server 40 is an Intel-based platform with pre-configured hardware and a version of DOS installed on its hard disk drive that is capable of being booted by the application of power to the server 40 causing its boot file (such as autoexec.bat and/or config.sys) to be run.

The console hardware 60 (such as an Intel-compatible PC running a proprietary operating system such as Microsoft Windows NT™) is used to host console software 65. The console hardware 60 includes a mains power switching unit 66 and an event monitoring unit 67. The console hardware 60 is attached to the local network 16 through a hardware interface and associated software. Consequently, the console 60 is capable of detecting a protected server failure and responding automatically by selecting and "powering on" an appropriate recovery server 40.

Figure 3A:
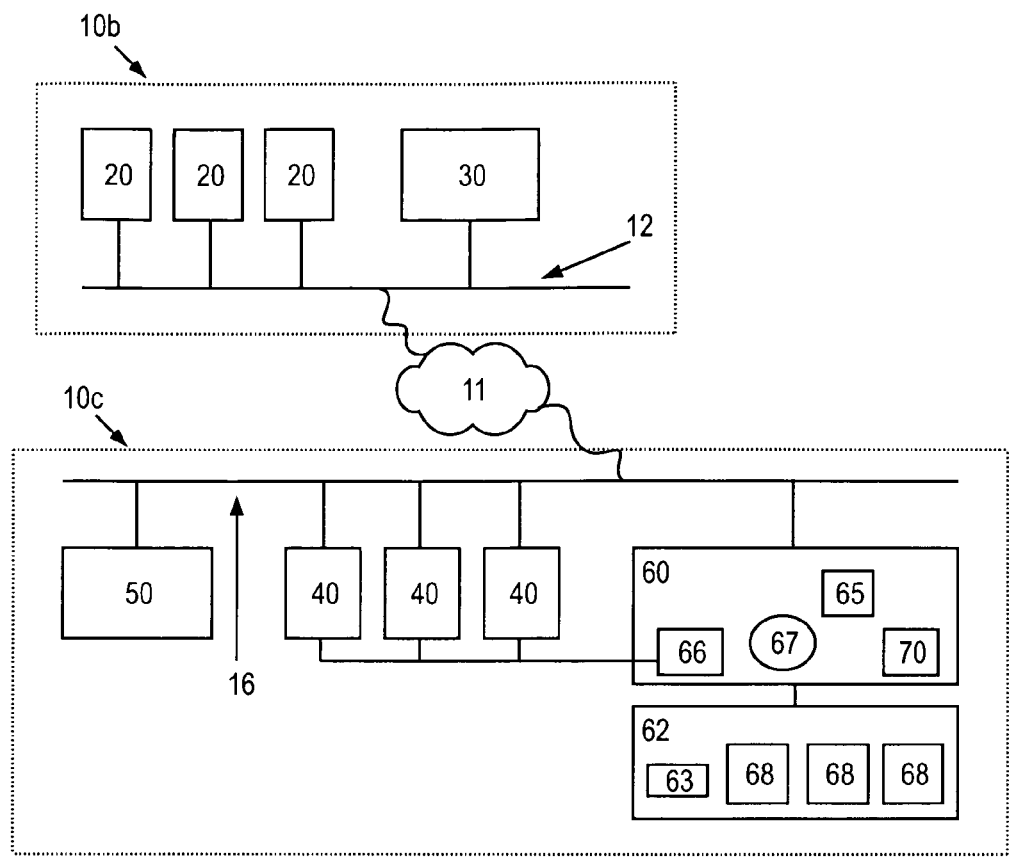
FIG. 3A is a schematic diagram showing the protected network of FIG. 1 in communication with a remote recovery network which is suitable for implementing another method of recovering data (remote recovery), according to second and third embodiments of the invention.

The console software 65 comprises such algorithms, procedures, programs and files as are required to ensure that the optimum server recovery response is delivered in the event of any combination of failure events as may be notified to the console software 65. The console software 65 is additionally required to store such images (i.e., snapshots of data which correspond to the operating system and files) as are required to permit the protected servers 20 to be replicated on potentially dissimilar recovery servers 40. Three such images 68 are shown in FIG. 3a.

The console software 65 also includes a database 62 (such as MS Access™, or MSDE™) with a record structure as shown in FIG. 3d. This record comprises the processor type, the processor manufacturer, the speed of the processor, the size of the random access memory, and the hard disk capacity. That is, such information as is required to programmably identify an optimum recovery server 40 from those available on the remotely located local network 16. The selection criteria for the optimum recovery server 40 may vary according to circumstances, but include server ability to satisfy the minimum operating requirement of the image 68 that is to be loaded. Other rules may be imposed by system managers or users 14 of the invention to minimize the exposure to risk in the event that multiple servers 20 fail concurrently, for example by always selecting the lowest specification server 40 available that satisfies the minimum requirement.

Figure 4A:
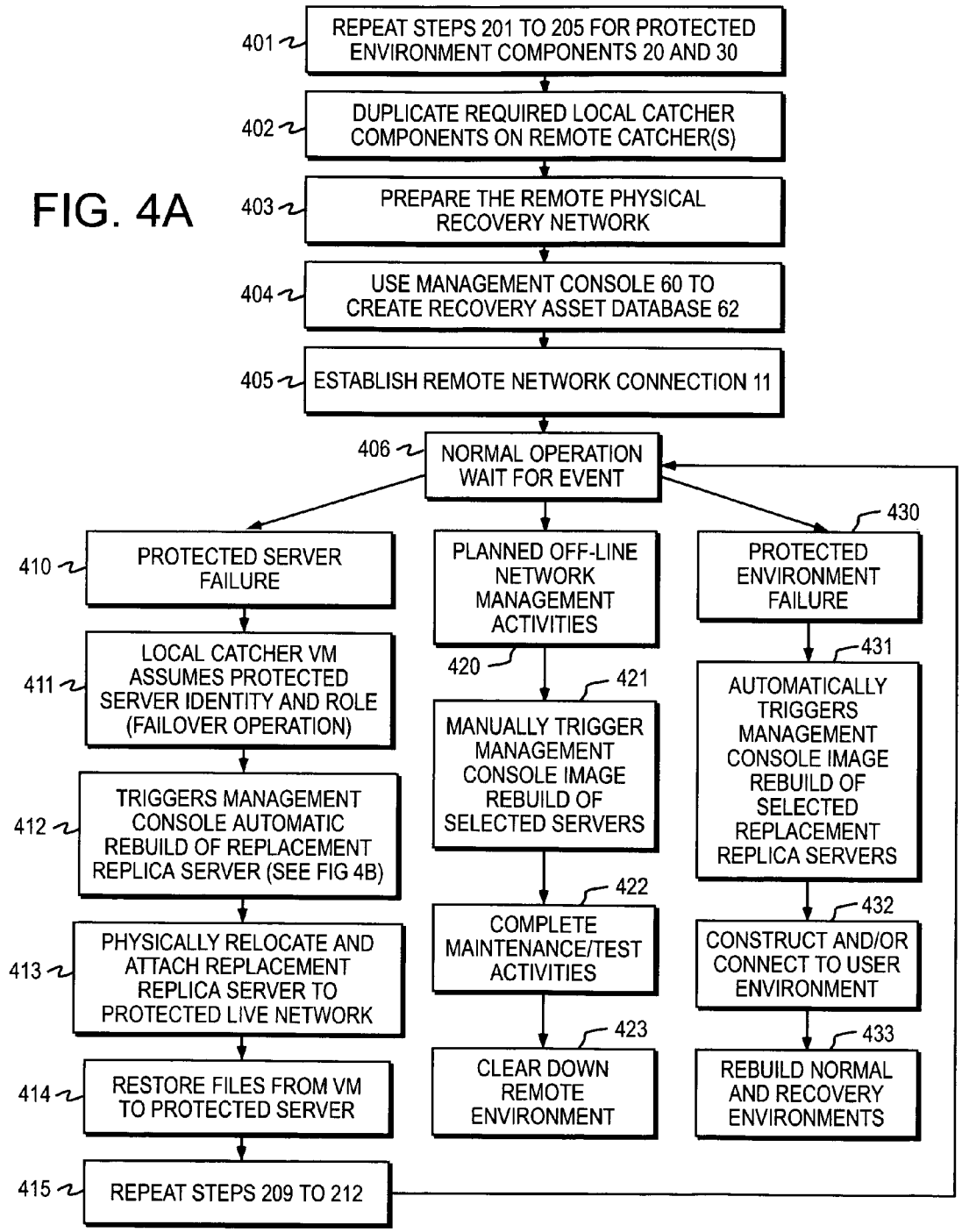
FIG. 4A is a flow diagram showing the method steps involved in carrying out the second, third and fourth embodiments of the invention.

A method of backing up and recovering critical data according to the second embodiment of the invention is now described with reference to FIG. 2 and FIGS. 4a and 4b.

In Step 401, the protected environment 10b is created by following previously described Steps 201 through 205 inclusive. That is, firstly the protected catcher 30 is configured and prepared. Secondly, the virtual machines 31 are created and configured on the protected catcher 30. Then the protected servers 20a,20b are duplicated on their respective virtual machines 31a,31b, followed by the mirroring of files from the protected servers 20a,20b to the virtual machines 31a,31b. Next, the replication of ongoing changes to the files/data residing on the protected servers 20a,20b is carried out, if required.

In Step 402, the recovery catcher 50 is built by repeating Steps 201 and 202, and thereby creating such virtual machines 51a etc as are necessary to support each of the protected servers 20a,b etc which may require remote recovery capability.

Each virtual machine 51a etc residing on the recovery catcher 50 is uniquely identified to the network 16, and as mentioned previously is equipped with an operating system 58, an application program 55a and replication software 36 configuration that is identical to its counterpart protected virtual machine 31a etc. This may be achieved by taking a conventional backup of the protected virtual machine 31a and restoring this backup to the corresponding recovery virtual machine 51a.

In Step 403, the recovery servers 40 are each physically, but not logically, connected to the network 16 by appropriate means. Each of the recovery servers 40 is pre-configured with only a network boot image (i.e. a bootable operating system that will bring up a server that is network enabled) resident on its hard disk drive, such as is described in Step 412 below.

In Step 404, the console 60 and associated database 62 are prepared by specifying in advance which recovery server 40 is capable of taking over the function and role of each of the protected servers 20, and specifying any preferred recovery servers. This step also includes physically and logically connecting the console 60 to the network 16 by appropriate means.

In Step 405, the network connection 11 between the protected environment 10b and the recovery environment 10c is established.

In Step 406, the replication software 36 installed on each recovery catcher virtual machine 51a etc and its corresponding protected catcher virtual machine 31a etc are configured and activated to synchronise the recovery catcher virtual machines 51a etc with the protected catcher virtual machines 31a etc, such that file changes taking place on a given protected server 20 are first replicated to the designated protected catcher virtual machine 31a etc, and where so required are subsequently again replicated to the corresponding recovery catcher virtual machine 51a etc.

In Step 410 a protected server 20 fails. As a result of this failure, a failover condition is entered at Step 411 such that the designated virtual machine 31a etc on the protected catcher 30 substantially immediately adopts the failed protected server's identity and role (as in Step 207 of the previously described method).

In Step 412, the protected catcher 30 transmits an indication to the console 60 in order to uniquely identify the failed protected server(s) 20. This failure is indicated to the console 60 by sending a file containing the identity of the failed protected server (s) 20 via the network connection 11. The console 60 is programmed such that on receipt of this file (or when it detects protected environment 10b failure such as the culmination of a pre-defined period during which a "heartbeat" signal from protected catcher 30's replication software 36 is found to be absent), it submits the failed protected server 20 identity to a pre-installed database application 63 and obtains from the database application the identity of the previously selected best fit recovery server 40 and a custom-written DOS batch command file 70. The console 60 then enables the supply of power to the selected recovery server 40 causing the recovery server to boot using the pre-installed network boot image, and then activating the recovery server 40 that will be used as a physical replacement for the failed protected server. The individual steps taken to implement the automatic rebuilding of the replacement replica protected server 20 are now described with reference to FIG. 4b.

In step 4120, power is applied by the console 60 to the recovery server 40 causing it to boot and run its boot file as is normal for Intel-based server platforms. The boot file issues a command to the console 60 via the network 16 instructing the console 60 to construct and execute a batch file 70 on its hard disk drive. This batch file 70 is built to contain instructions that are specific to the identity of the failed protected server and the selected recovery server. The console batch file 70 causes a replication software script 37 to be created that is specific to the identity of the failed protected server 20, the selected recovery server 40 and the corresponding virtual machine 51a etc on the recovery catcher 50.

In step 4121, the console batch file 70 runs and uses the already available identity of the failed protected server 20 to locate the database-stored pre-prepared image 68 that must be loaded onto the recovery server 40. The console batch file 70 commands this image 68 to be transmitted across the network 16 and loaded onto the recovery server 40 hard disk drive. The image 68 contains a special disk partition (called the "back door") that enables the failed protected server operating system 22 to be loaded as an image, and then activated without the normally required level of manual intervention, such techniques being familiar to those skilled in the art. The image also contains a copy of the replication software 36.

In Step 4122, the console batch file 70 accesses the recovery server 40 via the back door copy of the operating system and starts the recovery server, thereby creating a fully operational and networked server environment with no applications installed or running. The console batch file 70 then starts a monitor program that polls the network 16 searching for a replication software session against which to run the specifically prepared replication script 37.

In Step 4123, the replication software 36 is automatically started from within the recovery server operating system, sending a ready signal to the network 16.

In Step 4124, a console monitor program detects the recovery server 40 replication software 36 ready signal and starts the replication software on the recovery catcher 40 against the specifically prepared replication script 37, thereby establishing a replication activity between the recovery server 40 and the corresponding recovery catcher virtual machine 51.

In Step 4125, the replication software 36 on the recovery catcher virtual machine 51 completes the specifically prepared replication script 37 causing the applications and other files resident in the recovery catcher virtual machine 51a etc to be synchronised with the recovery server 40.

Returning now to FIG. 4a, in Step 413 the mirroring of the failed protected server 20 and any subsequent changes captured by the protected catcher 30, recovery catcher 50 and recovery server 40 is completed, and ongoing replication between the recovery catcher virtual machine 51 and the recovery server 40 is taking place. The console 60 terminates replication to the recovery server 40 automatically, on completion of replication, or manually, and the recovery server 40 is then optionally physically detached from the network 16 and physically attached to the local (protected) network 12 ensuring that there is no conflict of identity with other servers 20 and virtual machines 31a etc on the network as in Steps 207 and 208.

In Step 414, the replication script 37 used to replicate data from the protected servers 20 to the protected catcher 30 may be used to synchronise the protected catcher virtual machines 31a etc with the recovery servers 40 (now protected servers 20) that have been attached to the protected network 12. However, a replication script is not absolutely necessary, and the replication process can be initialised manually.

In Step 415, previous Steps 209 through 212 inclusive are repeated for each recovery server 40 (now protected server 20) and its corresponding protected catcher virtual machine 31a etc, thereby synchronising and restoring protected server 20 functionality to the protected local network 12.

On completion of the above described process, the local protected network 12 is substantially restored to its normal operating condition permitting additional recovery servers 40 to be profiled and attached to the recovery network 16. Should a further failure occur on the protected network 12, the additional recovery servers 40 are in place and ready to provide back-up and recovery of the protected servers 20 for subsequent similar purpose should a further failure occur.

The aforedescribed network combination 10b, 10c can also be used for off-line management activities according to an alternative second embodiment of the present invention. More particularly, the recovery network 10b can be used as a means of providing a controlled secure environment for the completion of protected system management activities such as testing and installation of upgrades. Such management activities are now described with reference to Steps 420 to 423 of FIG. 4a.

In order to initialise a suitable environment, Steps 401 through 406 are completed as previously described.

In Step 420, an appropriate time to undertake network management activities (e.g., lunchtime or the weekend) is identified, and which protected server 20 is to be included in the management activity are determined.

In Step 421, the console 60 is used to trigger construction of a replica recovery server 40 in respect of the identified protected server 20 using previously described Step 412. However, in this method, failover is not performed by the protected catcher 30 and the protected server 20 continues to operate normally.

In Step 422, the console 60 is used to terminate replication from the recovery catcher virtual machine 51a etc to the recovery server 40 and this server is available to be physically detached from the recovery network 16, whereupon it physically attached to a test network (not shown), allowing use for system management or other purposes.

In Step 423, once testing etc has been completed, all operational data is cleared down from the detached recovery server 40. Step 403 is now repeated, restoring the recovery network 16 to its ready condition.

It is to be appreciated that for testing purposes described above and even replacement of failed servers on the local network 12, it is not necessary in this embodiment for the local network to employ a protected catcher 30. Rather, all of its functions can be carried out by the remote catcher 50.

[The previous method described the use of the recovery environment 10c to provide a back-up and recovery system to deal with the failure of protected servers 20. However, the recovery environment 10c may also be used to protect against the failure of the entire protected environment 10b. The flow diagram in FIG. 4a shows further method Steps 430 to 433 in which a way of responding to failure of the entire protected environment 10b is described according to a third embodiment of the invention. This circumstance may arise due to widespread equipment failure, destruction of buildings or loss of telecommunications or other causes. If such an event occurs, it may be desirable to reconstruct automatically the protected environment 10b using the information and equipment in the recovery environment 10c.

Firstly, the protected environment 10b and the recovery environment 10c are initialised in the manner as previously described in Steps 401 to 406. In Step 430, the protected environment 10b fails causing loss of replication between the protected catcher 30 and recovery catcher 50. In Step 431, the console 60 detects that the protected environment 10b has failed (for example, by the culmination of a pre-defined period during which a "heartbeat" signal from protected catcher's replication software 36 is found to be absent) and responds by identifying and automatically powering on and installing the required software images 68 onto the optimum set of recovery servers 40 that will be used as replacements for the failed protected servers 20.

In this embodiment of the invention, the console 60 submits all failed protected server 20 identities to a pre-installed database 62 and, according to a pre-programmed priority sequence, obtains the identities of the most appropriate recovery servers 40 and corresponding DOS batch files 70. The console 60 enables the supply of power to the recovery servers 40 causing them to boot using the pre-installed network boot images. The console 60 then triggers the automatic rebuilding of replacement replica servers using the mirroring process (Step 412).

In Step 432, once the mirroring of the recovery catcher 50 and recovery server 40 is completed, the recovery servers 40 are then capable of either being physically detached from the network 16 or, should the need arise, can be used in situ for emergency operational activities.

In Step 433, the protected and recovery environments 10b, 10c are rebuilt in response to specific circumstances. This could include the rebuilding of the protected environment if the replica recovery servers 40 are being used in situ, or the rebuilding of the recovery environment if the replica recovery servers have been physically detached from the recovery environment. Ultimately, Steps 401 through 406 are repeated to re-establish continuous operational capability.

Where a protected catcher virtual machine 31a,31b is not represented directly on the recovery catcher 50 it will not be possible to provide extended recovery of the corresponding protected server 20a,20b. However, it will be possible to provide simplified recovery, such choice being available to the user by appropriate configuration of the virtual computing software 53 running on the recovery catcher 50.

There may be circumstances where remote location of the recovery network 16 is undesirable or infeasible, or where economics or practicalities dictate the use of a single catcher server 30 in which case there is provided a further method (the extended local method) of backing-up and recovering critical data according to a fourth embodiment of the present invention which is now described.

Figure 3B:
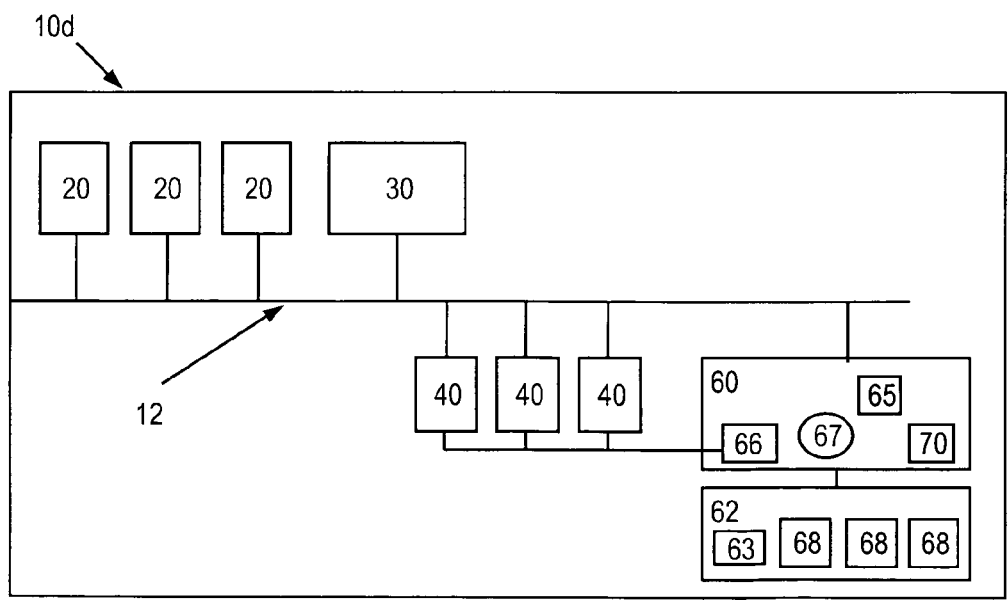
FIG. 3B is a schematic diagram showing a further network suitable for implementing a further method of recovering data (local recovery), according to the third embodiment of the invention.

Referring to FIG. 3b, there is shown an environment 10d suitable for implementing the extended local method. The network 12 includes three protected servers 20, a catcher computer 30, three recovery servers 40, and a console 60. In this embodiment of the present invention, the functions performed by the protected catcher 30 and the recovery catcher 50 of the aforedescribed second and third embodiments of the invention are combined in the local catcher 30.

The local catcher 30 is configured substantially identically to the protected catcher 30 of the second embodiment. The local catcher 30 may be required to replicate concurrently with protected servers 20 and recovery servers 40, and the replication software 36 is configured to allow this to take place.

The extended local method of the invention is substantially identical to the extended remote method, except that as the recovery servers 40 and local catcher 30 are part of the same local network 12, they may be concurrently affected by local environment failures which affect either the local catcher 30 or the local area network 12. It can be seen from FIG. 3b that the extended local method is substantially identical to the aforementioned extended remote method of the invention, but it excludes the recovery catcher 50 and the remote recovery network 16. The individual steps of the extended local method of the present embodiment of the invention are now described with reference to the flow charts shown in FIGS. 4a and 4b.

In Step 401, the protected environment 10b is created by following previously identified steps 201 through 205 inclusive.

Step 402 is omitted in this embodiment, there being no remote catcher 50.

In Step 403, the recovery servers 40 are each connected to the local network 12 by appropriate means with only a network boot image such that when power is applied to the recovery server it boots directly into the console 60. As previously described, the console 60 includes a mains power switching unit 66, and an event monitoring unit 67.

In Step 404, the console 60 is prepared and connected to the network 12 by appropriate means and its database 62 populated with images 68 appropriate to the protected environment 10b.

Step 405 is omitted in this embodiment of the invention, there being no external networking requirement.

Step 406 is also omitted in this embodiment of the invention, there being no requirement to connect or synchronise the protected 20 and recovery catchers 50, these being replaced by local catcher 30.

In Step 410, a protected server 20 fails.

In Step 411, a failover condition is entered such that the designated virtual machine 31 on the local catcher 30 adopts the failed protected server's identity and role.

In Step 412, the local catcher 30 transmits an indication to the console 60 uniquely identifying the failed protected server 20. The console 60 is programmed so that when such indication is received, or when it detects protected environment failure (such as the culmination of a pre-defined period during which a "heartbeat" signal from local catcher's replication software 36 is found to be absent) it responds by identifying and automatically powering on the optimum recovery server 40 that will be used as a replacement for the failed protected server 20, and installing the required software image 68.

Failure indication is achieved by the console 60 receiving a file containing the identity of the failed protected server 20 via the network connection 12 using File Transfer Protocol (FTP). On receipt of this file, the console 60 submits the failed protected server identity to the pre-installed database 62, and obtains from the database the identity of the most appropriate recovery server 40 and a corresponding DOS batch file 70. The console 60 enables the supply of power to the most appropriate recovery server 40 causing it to boot using the pre-installed network boot image (not shown).

Figure 4B:
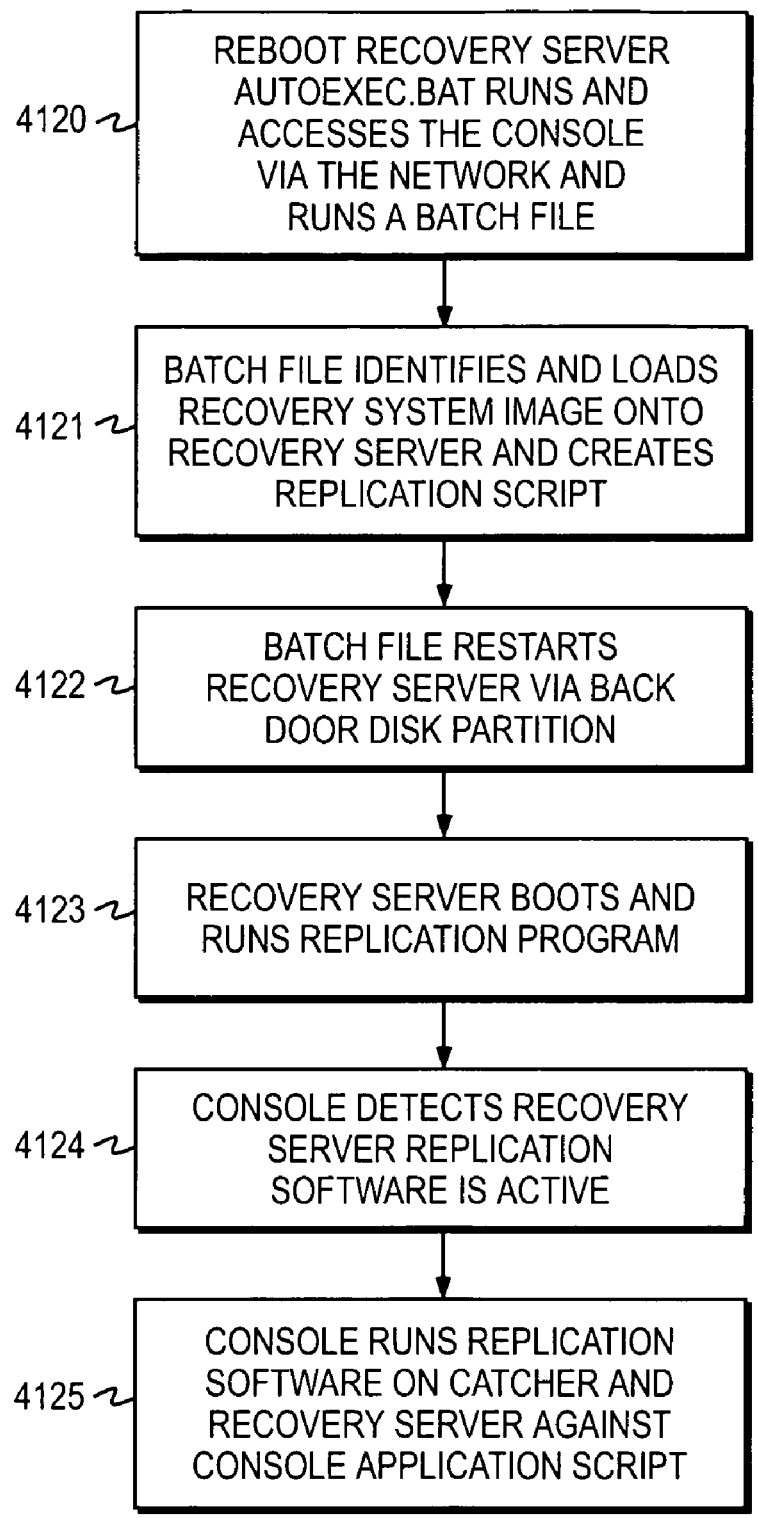
FIG. 4B is a flow diagram showing the steps of creating a recovery server according to the second, third and fourth embodiments of the invention.

The console 60 activates the recovery server(s) 40 according to the steps set out in FIG. 4b. As the process by which this takes place is identical to that carried out for the remote recovery network (which has already been explained), the details of the process are not included here.

Returning now to FIG. 4a, at Step 413 the mirroring of the failed protected server 20 and any subsequent changes captured by the local catcher 30 and the recovery server 40 is completed, and ongoing replication of the failed protected server 20 takes place. The recovery server 40 is then optionally left in situ (as it is already accessible to users on the network 12), or it is physically detached then re-attached to/from the network 12 using the methods previously described in Steps 207 to 208.

In Step 414, the replication script 37 used to replicate data from the protected servers 20 to the local catcher 30 may be used to synchronise the local catcher virtual machines 31a etc with the recovery servers 40 (now protected servers 20) that have been attached to the protected network. However, a replication script is not absolutely necessary, and the replication process can be initialised manually.

In Step 415, previous Steps 209 through 212 inclusive are repeated for each recovery server 40 and its corresponding local catcher virtual machine 31a etc, thereby synchronising and restoring protected server 20 functionality to the network 12.

On completion of the above described process, the protected network 12 is substantially restored to its normal operating condition permitting additional recovery servers 40 to be profiled and attached to the recovery network in readiness for further failures, should they occur.

Figure 5:
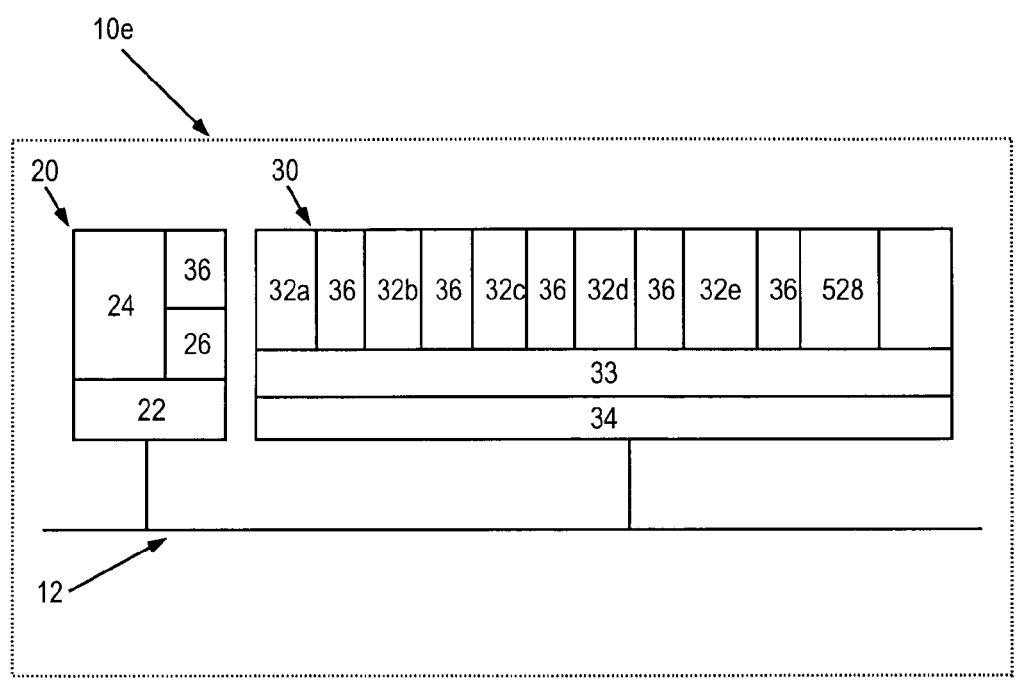
FIG. 5 is a schematic diagram of a network suitable for implementing a method of recording snapshots of protected servers (applied method), according to a fifth embodiment of the invention.

The fifth, and final, embodiment of the invention concerns the use of a catcher computer 30 for recording multiple snapshots of the protected servers 20. Referring now to FIG. 5, there is shown an environment 10e suitable for implementing the fifth embodiment of the invention which is known as the "applied" method.

The environment 10e comprises a local network 12, a protected server 20 and a catcher 30, these being configured in the manner already described herein. The protected server 20 includes applications 24, files 26, replication software 36, an operating system 22 which together are called the "applied environment". However, in the present embodiment of the invention, the catcher 30 supports five virtual machines 31a to 31e each hosting a replica of the same protected server operating environment, and each virtual machine capable of running replication software 36. The catcher 30 also supports a programmable scheduler application that is capable of issuing commands to other programs at certain times and/or after certain delays and/or on the occurrence of certain predetermined events.

In the present embodiment of the invention, virtual machine 31a is designated the "target" virtual machine, and virtual machines 31b to 31e are designated "rollback" virtual machines which store different "snapshots" of the state of the protected server 20 over time as is explained below.

Figure 6:
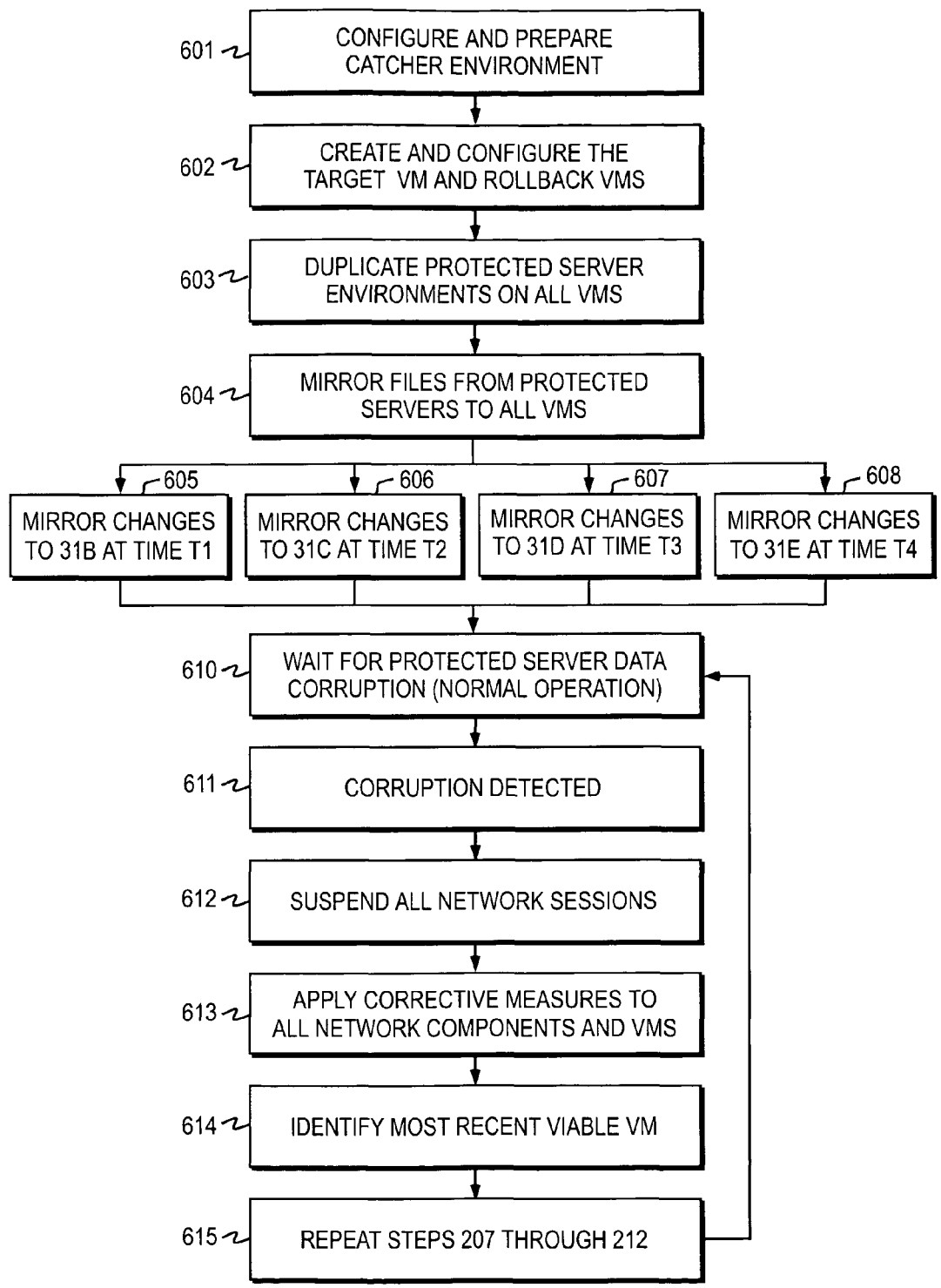
FIG. 6 is a flow diagram showing the steps of the applied method of the fifth embodiment of the invention.

Referring now to FIG. 6, in Step 601 the applied environment 10e is created by following previously described Steps 201 through 203 inclusive, thereby creating and installing the target virtual machine 31a so that it contains a near-replica of the protected server's operating system 22, files 26, and including applications 24 and data and mirroring software 36.

In Step 602, the target virtual machine 31a is copied to create additional identical rollback virtual machines 31b to 31e on the catcher 30. Replication is then initiated from the protected server 20 to the target virtual machine 31a as previously described in Steps 204 and 205.

In Step 603, the scripts 37 that direct the catcher replication software 36 in each of the rollback virtual machines 31b through 31e are programmed such that they mirror data from the catcher target virtual machine 31a to each respective rollback virtual machine 31b to 31e when so commanded in the manner previously described herein.

In Step 604, the scheduler program is programmed to schedule the running of the respective rollback virtual machine replication scripts 37 to run at such times and/or after such intervals as may be required.

In Step 605, at the scheduled time t1 the replication software 36 in rollback virtual machine 31b is triggered, and virtual machine 31a is mirrored to virtual machine 31b.

In Step 606, virtual machine 31a is mirrored to virtual machine 31c at time t2. In Step 607, virtual machine 31a is mirrored to virtual machine 31d at time t3. In Step 608, virtual machine 31a is mirrored to virtual machine 31e at time t4.

On completion of Steps 605 through 608, the cycle is resumed (starting at Step 605) until such time as the cycle is interrupted for whatever reason. This sequence of events allows the production of a series of 'snapshot' copies of the target virtual machine 31a and hence the protected server 20. As each snapshot is taken at different points in time, this allows the selection of the most appropriate snapshot under varying circumstances. For example, if data corruption was detected but actually occurred 6 hours ago, then the last snapshot taken prior to the corruption might be used to retrieve data which might otherwise be lost.

In Step 610, during and concurrent with Steps 605 to 608 inclusive, the replication software 36 running on the target virtual machine 31a is in normal condition and is continuously monitoring for pre-defined corruption events (such as notification that a virus or other data corruption or threat) impinging on the protected server 20.

In Step 611, the target virtual machine 31a detects a corruption event.

In Step 612, the target virtual machine 31a terminates replication to all catcher rollback virtual machines 31b to 31e inclusive, and runs a batch file (not shown) containing commands programmed to reduce the risk of further corruption (such as suspending all network sessions).

In Step 613, the cause of the disruption is either manually or automatically analysed, and the appropriate corrective measures are then applied to all affected network components and virtual machines 31 (such as running an anti-virus product, causing all network components to be disinfected).

In Step 614, it is decided whether to continue using the protected server 20, or whether to fall back to one of the rollback virtual machines 31b to 31e. Such a decision may be taken based on the results of the aforementioned analysis, and may take into account the extent of protected server 20 corruption, and the age of the information held on the rollback virtual machine.

At Step 615, in the event of direct corrective measures proving ineffective then, if the decision is taken to use a rollback virtual machine, the most recent viable rollback virtual machine is identified. The protected server 20 is then detached from the network 12 and rebuilt as described in Steps 208 through 212. Then the chosen viable virtual machine is then either manually or automatically failed back onto the physical protected server 510.

It can be seen that by using the applied method described herein, it is possible to maintain a more or less continuous fallback position for any protected server against a variety of different types of corruption that might be passed on to the virtual machine when using the first embodiment of the invention. In addition to this, the applied method may also be used in combination with the other embodiments of the invention disclosed herein.

Having described particular preferred embodiments of the present invention, it is to be appreciated that the embodiments in question are exemplary only and that variations and modifications such as will occur to those possessed of the appropriate knowledge and skills may be made without departure from the spirit and scope of the invention as set forth in the appended claims. For example, each separate network environments described herein are shown to include only a single catcher computer. However, multiple catcher computers could be used in both the protected and recovery environments, for example, in order to provide a back-up and recovery function for a very large network. Furthermore, simultaneous failure of two or more protected servers can be handle by relying on the catcher utilising two or more respective virtual machines to switch in recovery servers.

What is claimed is:

1. A computer-implemented system for sustaining the operation of a plurality of active networked computers, comprising:
    a plurality of virtual machines installed on multiple recovery computers which are physically separate from the plurality of active networked computers;
    each virtual machine being arranged to emulate a corresponding active networked computer; and
    the recovery computers being arranged, in the event of a change of status signal for one of the active networked computers, to activate and use the virtual machine which corresponds to the networked computer having a changed status.

2. The system of claim 1, wherein the recovery computers are arranged to connect a virtual machine, corresponding to a failed networked computer, to a communications network of the active networked computers in the event of failure signal for the failed networked computer.

3. The system of claim 2, wherein the connected virtual machine is made active by means for activating computer applications on the virtual machine which were in use on the failed networked computer.

4. The system of claim 3, wherein the failed network computer is made active by:
    means for restoring a networked computer operating environment for the failed network computer;
    means for commanding the virtual machine to relinquish an identity of the failed network computer; and,
    means for commanding the failed networked computer to establish a previous identity and become active.

5. The system of claim 1, wherein the recovery computers are arranged to connect a virtual machine, corresponding to a networked computer, to a communications network of the active networked computers in the event of change of status signal for the active networked computer to make the active networked computer inactive and the virtual machine active.

6. The system of claim 5, wherein the inactive network computer is made active by:
    means for restoring a networked computer operating environment for the inactive network computer;
    means for commanding the virtual machine to relinquish an identity of the inactive network computer; and,
    means for commanding the inactive networked computer to establish a previous identity and become active.

7. The system of claim 6, wherein the inactive network computer has a hardware change while it is inactive.

8. The system of claim 6, wherein the inactive network computer has a software change while it is inactive.

9. The system of claim 5, wherein performance of activated applications on the virtual machine can be monitored to determine if application performance requirements can be met while running the activated applications on the virtual machine.

10. The system of claim 5, wherein the recovery computers are arranged to connect a second virtual machine, corresponding to a second networked computer and where the second virtual machine is on the same recovery computer as the active virtual machine, to a communications network of the networked computers in the event of change of status signal for the second networked computer to make the second networked computer inactive and the second virtual machine active.

11. The system of claim 10, wherein the performance of activated applications on the virtual machine and the second virtual machine can be monitored to determine if application performance requirements can be met while running the activated applications on the two virtual machines on the same recovery computer.

12. The system of claim 5, wherein the recovery computers are arranged to connect more than one additional virtual machines to a communications network of the active networked computers in the event of change of status signal for more than one additional active networked computers to make them inactive and to make a corresponding more than one additional virtual machines active, the more than one additional virtual machines corresponding to the more than one additional active networked computers and the more than one additional virtual machines being located on different recovery computers.

13. The system of claim 12, wherein load balanced performance of activated applications on the active virtual machines can be monitored to determine if application performance requirements can be met while running the activated applications on virtual machines on different recovery computers.

14. A computer-implemented system for rapidly creating a replacement network computer arranged, in the event of a fault condition, to restore the operation of a plurality of networked computers connected via a communications network, the system comprising:
    a plurality of virtual machines installed in physical recovery computers on the same communications network as the networked computers, each virtual machine being arranged to emulate a corresponding networked computer,
    a plurality of back-up computers on the same communications network as the networked computers, and
    a console arranged to control recovery of the plurality of networked computers, wherein the console is arranged, in the event of failure of one of the networked computers, to restore a selected back-up computer with the image of the failed networked computer from the failed networked computer's corresponding virtual machine for physical replacement of the failed networked computer.

15. The system of claim 14, wherein the recovery computers and back-up computers are on a remotely located second communications network.

16. The system of claim 15, wherein the selected back-up computer is removable from the second communications network and is arranged to be attachable to the first communications network for physical replacement of the failed networked computer.

17. The system of claim 16, wherein the network computers are connected to multiple communications networks and selected from the group consisting of personal computers and shared computers.

18. A computer-implemented method for sustaining the operation of a plurality of active networked computers, comprising the steps of:

installing a plurality of virtual machines on multiple recovery computers, the multiple recovery computers being physically separate from the plurality of active networked computers;

arranging each virtual machine to emulate a corresponding active networked computer; and arranging the recovery computers, in the event of a change of status signal for one of the active networked computers, to activate and use the virtual machine which corresponds to the networked computer having a changed status.

19. The method of claim 18, further comprising the step of connecting a virtual machine, corresponding to a failed networked computer, to a communications network of the active networked computers in the event of failure signal for the failed networked computer.

20. The method of claim 19, further comprising the step of making the connected virtual machine active by activating computer applications on the virtual machine which were in use on the failed networked computer.

21. The method of claim 20, further comprising the step of making the failed network computer active by:

restoring a networked computer operating environment for the failed network computer;

commanding the virtual machine to relinquish an identity of the failed network computer; and, commanding the failed networked computer to establish a previous identity and become active.

22. The method of claim 18, wherein the step of arranging the recovery computers comprises connecting a virtual machine, corresponding to a networked computer, to a communications network of the active networked computers in the event of change of status signal for the active networked computer for making the active networked computer inactive and the virtual machine active.

23. The method of claim 22, further comprising the step of making the inactive network computer active, including:

restoring a networked computer operating environment for the inactive network computer;

commanding the virtual machine to relinquish an identity of the inactive network computer; and, commanding the inactive networked computer to establish a previous identity and become active.

24. The method of claim 23, further comprising the step of making a hardware change to the inactive network computer while it is inactive.

25. The method of claim 23, further comprising the step of making a software change to the inactive network computer while it is inactive.

* * * * *